INVENTOR
ANTHONY A. ABBATIELLO
BY
ATTORNEY

May 7, 1957  A. A. ABBATIELLO  2,791,372
PUMP

Filed April 26, 1945 3 Sheets-Sheet 2

INVENTOR
ANTHONY A. ABBATIELLO
BY
*Robert A. Lavender*
ATTORNEY

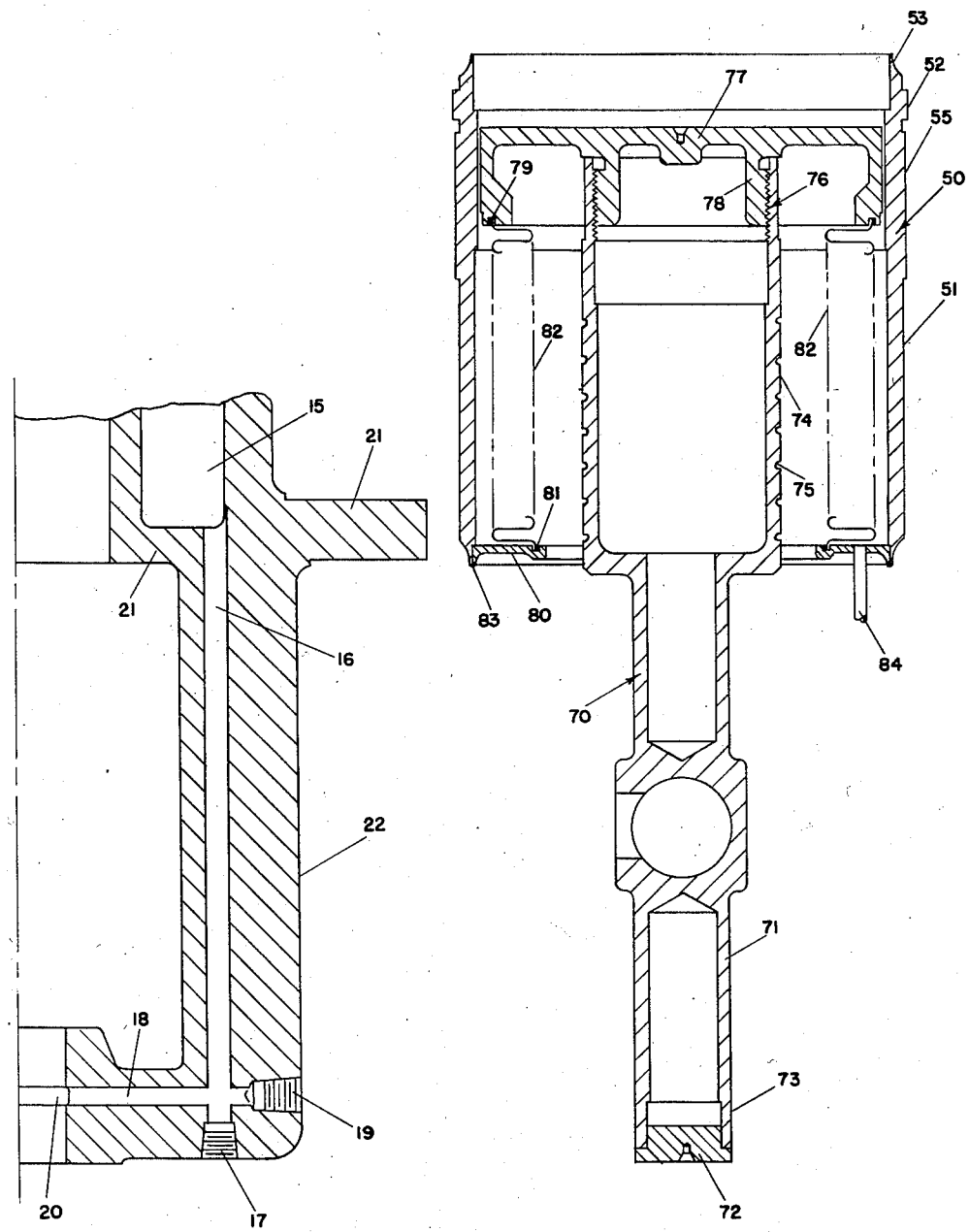

United States Patent Office 2,791,372
Patented May 7, 1957

2,791,372

PUMP

Anthony A. Abbatiello, Teaneck, N. J., assignor to the United States of America as represented by the United States Atomic Energy Commission Application April 26, 1945, Serial No. 590,433

6 Claims. (Cl. 230—185)

This invention relates to a high speed, floating piston, finely sealed pump.

An object of this invention is to support the piston of a pump in floating relation to the wall of its cylinder, that is to say, in close proximity to but out of contact with the cylinder wall within which it works. Another object of the invention is to seal the working surfaces of a pump and the spaces connected therewith from the other spaces of the pump, and to balance the pressures on opposite sides of the seal. Another object of the invention is to oil an elongated bearing which is subjected to high speed reciprocation over long periods of time. Another object of the invention is to seal contiguous spaces of pump parts so that considerable differential pressures will produce no substantial leakage past them.

Figure 1:
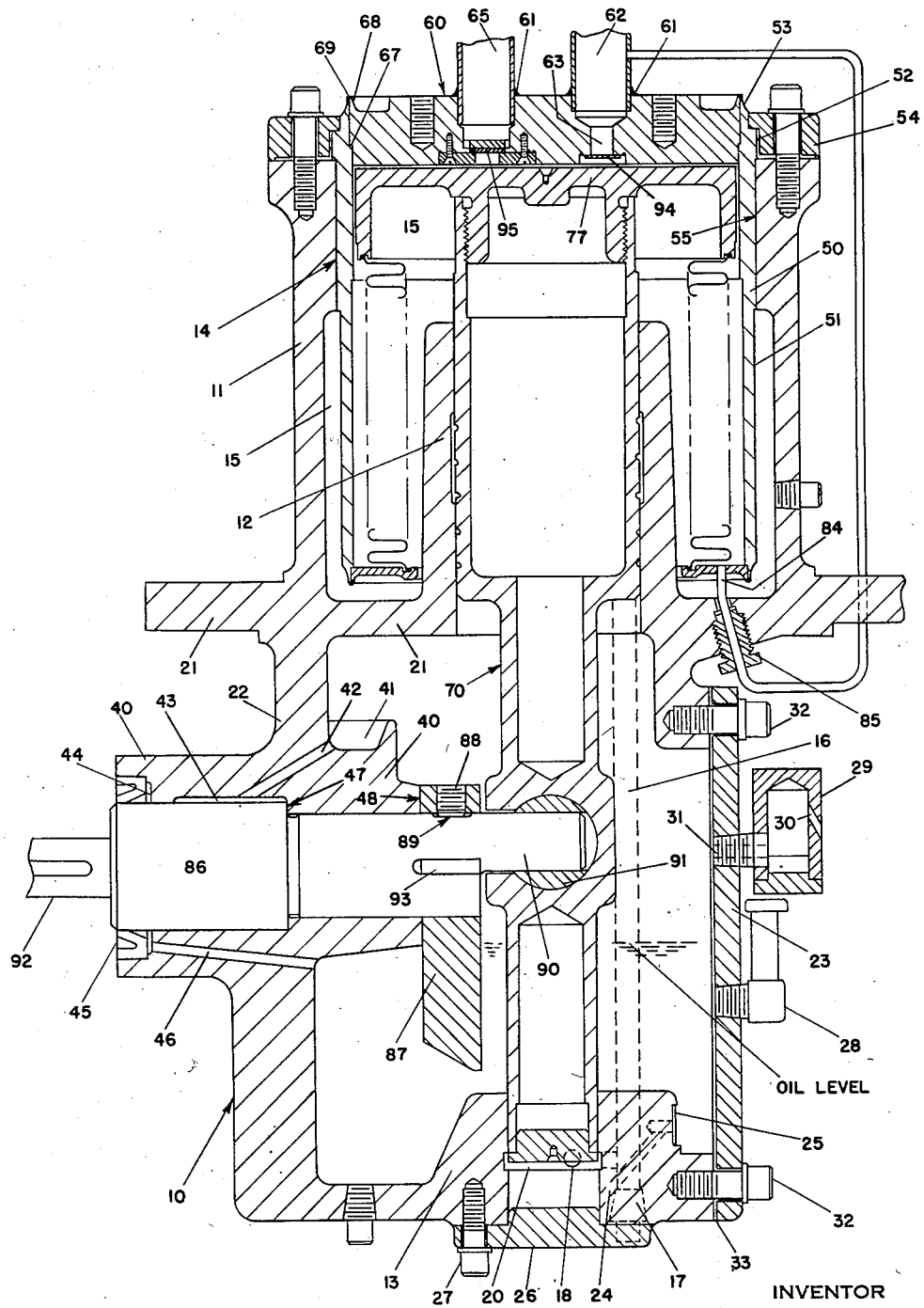
Figure 2:
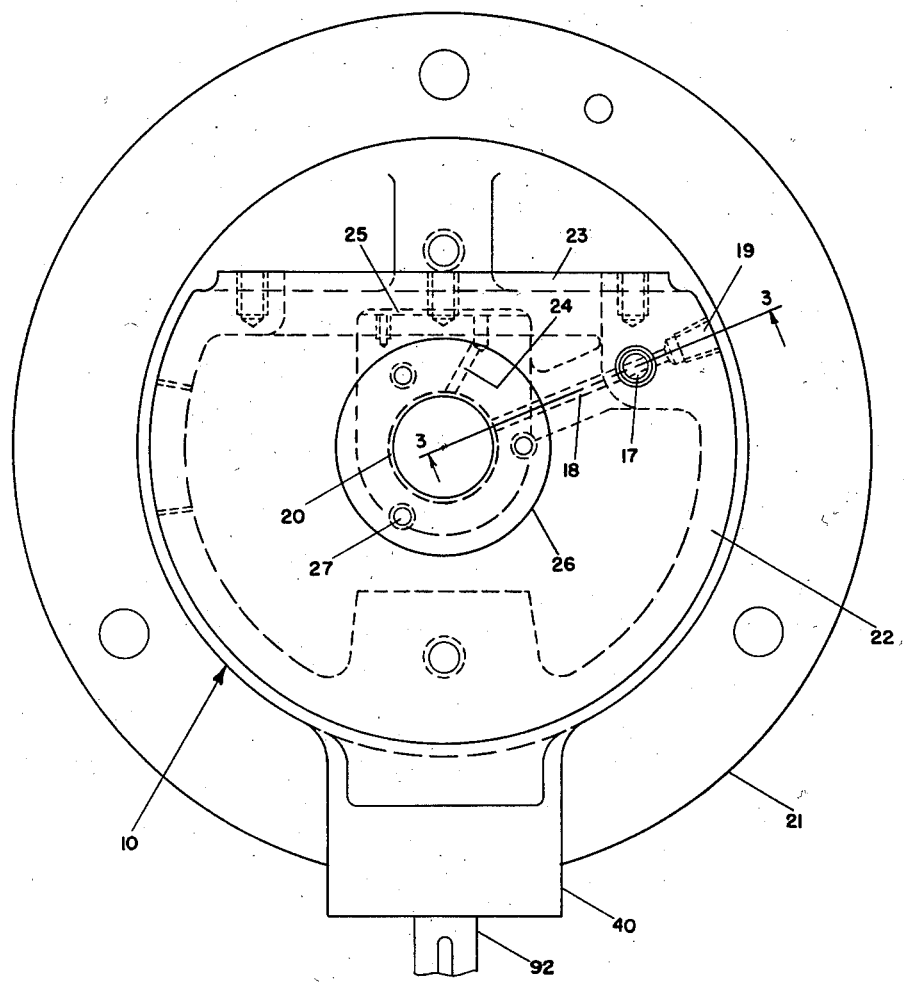
Figure 5:
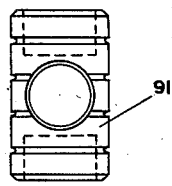

A preferred embodiment of the invention is disclosed in the accompanying drawings, which are intended as illustrative and not scale or working drawings, and wherein like parts are indicated by like numerals. In the drawings, Fig. 1 is a vertical section through a pump constructed in accordance with the preferred principles of this invention. Fig. 2 is an inverted plan view of the pump shown in Fig. 1. Fig. 3 is a section on the line 3—3 of Fig. 2, looking in the direction of the arrows. Fig. 4 is a cross-section taken vertically through the piston and connecting rod sub-assembly. Fig. 5 is a plan view of the crank slide of the Scotch yoke.

The casing of the pump is important and its construction and method of making will be described in considerable detail. In the drawing the casing in indicated generally by the numeral 10 and has an upper cylindrical portion 11, and a lower oil sump 22, which are separated by a bulkhead 21 which is extended outwardly beyond the wall of the casing to form a supporting flange. The central part of the bulkhead 21 is extended upwardly to form the cylindrical bearing 12, which is slightly enlarged midway of its length to form an oil-receiving grove. The sump 22 has an inwardly extending interiorly circular boss 13 which serves both as a pump cylinder and as a bearing. The pump casing is made of cast iron by normal processes of casting, but great care is taken to see that the seat 14 which receives the liner 50, the bearing surface of bearing 12, and the bearing surface of bearing 13, are machined about the same center line and with great accuracy. This machining may be and preferably is accomplished simultaneously on one machine, with the result that the two bearings and the seat are truly concentric even though they are spaced apart.

The chamber 15 of the cylinder is enlarged below the seat 14. The cylinder 13 is closed by the cylinder cover 26 which is held in place by bolts 27. The oil sump is open at one side, so far as the structure of the casting itself is concerned, and that opening is closed by the plate 23 which is held in position against the gasket 33 by the bolts 32. The cover plate 23 may be removed to permit the assembling or dismantling of the apparatus.

An additional opening may be placed at any point in the wall of the sump to give entry to tools or the like, if desired. All such openings should be capable of being sealed by tight closures. After the apparatus is assembled the sump is filled with oil to about the level indicated in the drawing. An oil level gauge 28, which is diagrammatically shown in Fig. 1 of the drawing, is mounted in the closure plate 23.

A nickel or Monel metal liner 50 fits within the cylinder casing and is provided with a seat 55 which corresponds with great accuracy to the seat 14 of the cylinder block. This liner extends, when it is in place, almost to the bottom of the chamber 15, and it is provided toward its upper end with an abutment ring 52 whose lower face rests upon the upper face of the cylinder wall. The upper face of the abutment ring 52 forms a ledge upon which a clamping ring 54 may be seated by means of bolts which are shown in Fig. 1. The liner 50 is machined with great accuracy so that its inner wall will be exactly concentric with the center line of the seat 14, the bearing 12, and the bearing 13.

The end of the cylinder is closed by a cylinder head 60 which has a small ledge 67 seated upon a similar ledge formed in the inner surface of the liner 50. At its upper end the liner is reduced to a fine edge 53. The upper edge of the cylinder head is provided with a conforming fine flange 68. The fine edge 53 and the fine flange 68 are contiguous and are joined and sealed by an atomic weld 69. The use of this structure makes it possible to obtain a tightness of seal that is measured in fractions of a micron of pressure and which is not believed to be obtainable by other means.

Looking now at Fig. 4, and particularly at the lower end thereof, the liner 50 is drawn to a fine knife edge and a ring 80 provided with a fine flange contiguous to the edge of the liner is seated thereagainst and joined thereto by an atomic weld 83.

The piston 77 has a depending skirt with a groove 79 extending annularly about its lower edge, within which one end of a copper, or other metal, bellows 82 is silver or soft tin soldered or welded. The lower end of the bellows is welded at 81 in an annular groove formed in the upper surface of the ring 80.

An inlet pipe 62 is connected, through a port 63 in the cylinder head 60 and by means of a reed valve 94, with the interior of the cylinder. The reed valve 94 opens inwardly. A similar reed valve 95 which opens outwardly connects the interior of the cylinder with a passage in the cylinder head and the exhaust pipe 65. As the piston 77 is reciprocated gas is drawn through the reed valve 94, compressed within the cylinder, and forced out through the reed valve 95.

The significance of the structure which has just been described is in part as follows: The inlet and outlet pipes 62 and 65 are welded or silver soldered to the cylinder head as shown at 61, so that a tight seal is formed. The atomic weld 69 forms a tight seal between the cylinder head and the liner. The ring 80 is sealed to the bottom edge of the liner by an atomic weld and the bellows 82 is sealed to the ring 80 and to the skirt of the piston by soldering or by welding. The area of compression between the cylinder head and the piston (or rather, the area of vacuum, because this pump is very frequently used for reducing pressures), is completely sealed and with such perfection that it has been proved by the G. E. leak detector to leak less than .0018 microns of mercury times cubic feet, per hour at a pressure differential of one atmosphere. It will be understood that not all pumps are so tight, and that such perfection is dependent upon factors such as good workmanship in the making of the pump, but sealing at .1 micron and less are attained with complete regularity.

The piston 77 does not ride upon the liner 50 but is carried by the connecting rod which is supported in the bearings 12 and 13. In this way the piston can be given very fine clearance with respect to the wall of the liner without actual frictional contact.

In Fig. 4 a connecting rod 70 has a lower portion 71, the outer surface 73 of which is a bearing surface. The rod is hollow for purposes of lightness except at the Scotch yoke, and is plugged at the lower end by the plug member 72 which acts as a piston. The upper end 74 of the connecting rod is enlarged and has a number of oil grooves 75 which are spaced apart a distance less than the stroke of the piston. For instance, if the piston be given a stroke of ½ inch, these grooves may be spaced ⅜ inch. The upper end of the connecting rod is screw threaded at 76 and receives the internal screw-threaded boss 78 which forms a part of the piston 77. The connecting rod is carefully machined so that its dimensions are precise with respect to the center line as has been described hereinabove. The screw threading of piston and connecting rod, and the making of the piston is done precisely so that the curved wall of the piston is at all places equidistant from the wall of the cylinder liner. The lower face of the cylinder head and the flat face of the piston are also machined to provide very small clearance at the end of the stroke. The portion 73 of the connecting rod is seated in the lower bearing 13 and the portion 74 of the connecting rod is seated in the upper bearing 12 of the casting. The contact between the steel connecting rod 70 and the cast iron of the bearing is direct and not through an intermediate metal. With proper selection of lubricant the difference between the steel and the cast iron surfaces is sufficient to give adequate bearing lubrication and performance even at speeds as high as or higher than 900 R. P. M.

The piston assembly is put in place by removing the cylinder head and the plate 23, lowering the connecting rod until its lower end fits into the bearing 13 and putting the eccentric pin 90 of the drive shaft into position in the Scotch yoke connection. As will be understood by persons skilled in the art, the Scotch yoke comprises a member 91 shown in Fig. 5, called a rocking connection or crank slide, that is mounted for rocking motion in a sleeve about midway of the crank shaft. This crank slide has an opening into which the pin 90 can be fitted. This Scotch yoke connection, as just described, is not a part of this invention, but is a construction known to the prior art.

The drive shaft assembly, so far as it concerns this invention, is comprised largely of a drive shaft 86 which is seated in a boss 40 which extends through the wall of the casing and forms a bearing about shaft 86. The boss and the shaft have conforming abutments 47 which limit the inward motion of the shaft. Before the eccentric pin 90 of the drive shaft is emplaced in the crank slide of the Scotch yoke connection, an eccentric counterweight 87 is slid over the end of the pin, and, after the pin is seated in the slide the end of a screw 88, is seated in a depression 89 in the crankshaft. The face 48 of the boss 40, and the abutting face of the counterweight, serve to prevent the crank shaft from being withdrawn from its operating position. As the crank shaft is driven, by means of a pulley or a gear that may be mounted on the end 92 of the shaft, the counterweight 87, which balances the weight of certain of the moving parts of the assembly, splashes through the oil in the sump so that some of it makes its way into the cup 41 and through the passage 42 to the oil groove 43 which distributes the oil to the surface of the bearing of shaft 86. From this bearing the oil or some of it makes its way to a groove 44 toward the outside of the boss where its further progress is arrested by an oil ring 45, the details of which need not be disclosed because it is of known construction. Within the ring 44 the oil makes its way to a passage 46 and back to the oil sump. The oil and oil mist which are stirred up by the rotation of the crank shaft wet the lower end and certain of the oil rings of the upper portion of the connecting rod which carry the oil up into the bearing 12, where it is drawn further by repetition of the reciprocating motion, by collection in the oil groove in the bearing, and by the vacuum which exists within the chamber 15.

The chamber 15, which is sealed from the space next to the liner 50 by the bellows 82, is connected by a passage 16, as shown in Fig. 3, to a passage 18 which opens into a valve ring or groove 20 in the side of the lower bearing 13. From a lower point in the cylinder within bearing 13 a passage 24 leads to a reed valve 25 and to the interior of the sump. As the piston is reciprocated and reaches its upper position the passage 18 is uncovered by the lower piston and the vacuum created in the lower cylinder withdraws any excess oil that may have passed the bearing, and exhausts the chamber 15 so that excess pressures are not built up in it. When the lower piston goes downwardly, the air in the lower cylinder is compressed and forced out through the passage 24 and reed valve 25 to the interior of the sump. When the piston goes upward again the reed valve 25 closes, a vacuum is created within the lower cylinder, and the chamber 15 is again reduced in pressure. The size and construction of the lower cylinder and its operating piston are such that the pressure in the chamber 15 is maintained at substantially the pressure on the other side of the bellows 82. The gases forced into the oil sump by the lower piston make their way out of the casing through the tube and trap 31 and 30.

An auxiliary discharge tube 84 may be connected through a gland 85 to the space within the bellows and to the inlet pipe, to equalize those pressures, but it is not ordinarily necessary and may be omitted. The piston of this invention is supported in close proximity, that is, about .002 or .004 inch from the wall of the liner, but not in contact therewith. The working space about the piston is completely sealed without the use of rings. The pump runs at high speeds for a reciprocating pump, that is to say, in the neighborhood of 900 R. P. M. but the parts are so balanced that no particular vibration results. The arrangement of the parts of the pump prevents the wear of the bearings from bringing the pump piston and the wall into contact. A particular advantage of the invention arises from the fact that the pressures are balanced on opposite sides of the bellows. The use of a vacuum to lubricate a bearing surface in a pump of this sort is of great utility. The spacing of the oil grooves in the main body of the piston is an element of considerable advantage. The pump casting itself is novel and of great utility, particularly in the arrangement of the bearing and wearing surfaces. The use of a small pump simultaneously operated with the main pump and for the purpose of maintaining an equilibrium of pressures within the pump itself is believed to be novel. In general, this pump is superior to other pumps within its own field.

Since many embodiments of the present invention may be made, and since such embodiments may differ, it is to be understood that the foregoing description is to be interpreted as illustrative and not as a limitation in general or in detail except as set forth in the appended claims.

I claim:

1. A pump having a cylinder and a sump divided by a bulkhead; a bearing in the bulkhead, a combined cylinder and bearing in the sump, and a liner for said first-named cylinder, each of which is cylindrically true to the same center line; a connecting rod reciprocably supported in said bearings; a piston held by said rod in spaced relation to the said liner; means to reciprocate the rod and piston; means sealing the circumference of said piston to the said liner comprising an extensible metallic bellows; means to exhaust the space on one side of the bellows comprising a passage connecting the said space to an annular valve groove in the wall of the said cylinder-bearing; means to discharge said cylinder-bearing into the sump, and means to relieve pressure within the sump.

2. A pump having a cylinder head with inlet and outlet ports mounted on a casing comprising a cylinder and a sump divided by a bulkhead; a bearing in the bulkhead, a combined cylinder and bearing in the sump, and a liner for said first named cylinder, each of which is cylindrically true to the same center line; a connecting rod reciprocably supported in said bearings; a piston held by said rod in spaced relation to the said liner; means to reciprocate the rod and piston; means sealing the circumference of said piston to the said liner comprising an extensible metallic bellows; means connecting the space on one side of the bellows to the inlet port; means to exhaust the space on one side of the bellows comprising a passage connecting the said space to an annular valve groove in the wall of the other said cylinder, said groove being alternately covered and uncovered by the reciprocation of said piston; and means to discharge fluids from the cylinder-bearing.

3. A pump having a cylinder and a sump divided by a bulkhead; a bearing in the bulkhead, a combined cylinder and bearing in the sump, and a cylinder liner having aligned centers, the said bearings serving to support a connecting rod reciprocably and in spaced relation to the said liner; a piston at each end of said rod; means to reciprocate the rod; means sealing the working space of one of said pistons comprising an extensible metallic bellows connecting the piston to its cylinder wall; and means to exhaust the space on one side of the bellows comprising a passage connecting the said space to a valve in the other said cylinder.

4. A pump having a cylinder and a sump divided by a bulkhead; a bearing in the bulkhead, a bearing in the sump, and a cylinder liner having aligned centers, the said bearings serving to support a connecting rod reciprocably within the said liner; a piston carried by said rod; means to reciprocate the rod; means sealing the working surface of the said piston comprising an extensible metallic bellows connecting the piston to the cylinder wall; and means connecting the space on one side of the bellows to a pump whereby the action of the pump may exhaust the said space.

5. A pump having a pair of opposed cylinders, pistons reciprocable in each of said cylinders, a rod interconnecting said pistons, bearing means for supporting said connecting rod, said bearing means having a bearing surface confronting said connecting rod, means forming a source of lubricant for said bearing means, means associated with said connecting rod for reciprocating said rod and thereby reciprocating said pistons within said cylinders, a first conduit effectively interconnecting one of said cylinders and the bearing surface of said bearing means, a second conduit effectively interconnecting said bearing surface and said source of lubricant, and a third conduit effectively interconnecting said source of lubricant and said one cylinder whereby reciprocation of the piston in said one cylinder produces a flow of lubricant across the bearing surface of said bearing means.

6. A pump having a pair of opposed cylinders, one of which is a relatively large working cylinder and the other of which is a relatively small lubricating cylinder, pistons reciprocable in each of said cylinders, a rod interconnecting said pistons, a journal bearing supporting said rod and having a bearing surface confronting the surface of said rod, means adjacent to said journal bearing forming a source of lubricant for said bearing surface, driving means associated with said connecting rod for reciprocating said rod and thereby reciprocating said pistons within said cylinders, a first conduit extending from said bearing surface to said lubricating cylinder, a second conduit extending from said lubricating cylinder to said source of lubricant, said second conduit including a check-valve for preventing flow of lubricant from said source to said cylinder, whereby reciprocation of the piston within said lubricating cylinder causes oil to be drawn across said bearing surface and to be recirculated to said source of lubricant.

References Cited in the file of this patent
UNITED STATES PATENTS

| | | |
|---|---|---|
| 1,147,221 | Dittmar | July 20, 1915 |
| 1,239,869 | Block | Sept. 11, 1917 |
| 1,397,914 | Augustine et al. | Nov. 22, 1921 |
| 1,546,397 | Michelsen | July 21, 1925 |
| 1,670,799 | Dornbirer | May 22, 1928 |
| 1,696,436 | Gray | Dec. 25, 1928 |
| 1,740,924 | Kellogg | Dec. 24, 1929 |